(12) United States Patent
Niiya (10) Patent No.: US 6,978,000 B2
(45) Date of Patent: Dec. 20, 2005

(54) KEY TELEPHONE SYSTEM AND INTERFACE UNIT FOR KEY TELEPHONE

(75) Inventor: Norimasa Niiya, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 287 days.

(21) Appl. No.: 09/758,321

(22) Filed: Jan. 12, 2001

(65) Prior Publication Data
US 2002/0094071 A1 Jul. 18, 2002

(51) Int. Cl.[7] .............................................. H04M 1/00
(52) U.S. Cl. ...................................... 379/156; 379/157
(58) Field of Search ............................. 379/156, 93.01, 379/93.08, 93.15, 93.33, 165, 166, 198, 225, 379/234, 157; 370/456, 466

(56) References Cited

U.S. PATENT DOCUMENTS

| | | | |
|---|---|---|---|
| 5,193,089 A | | 3/1993 | Tsuchida |
| 5,319,700 A | * | 6/1994 | Mano et al. ................. 370/359 |
| 5,349,635 A | * | 9/1994 | Scott ....................... 379/93.34 |
| 5,448,560 A | * | 9/1995 | Chen et al. .................. 370/465 |
| 5,491,720 A | * | 2/1996 | Davis et al. ................. 370/465 |
| 5,943,364 A | * | 8/1999 | Yoshida ...................... 375/222 |
| 6,005,846 A | * | 12/1999 | Best et al. ................... 370/264 |
| 6,195,359 B1 | * | 2/2001 | Eng et al. .................... 370/401 |
| 6,263,061 B1 | | 7/2001 | Tanaka et al. ............... 379/156 |
| 6,389,065 B1 | * | 5/2002 | McGhee ...................... 370/252 |
| 6,424,636 B1 | * | 7/2002 | Seazholtz et al. ........... 370/295 |
| 6,496,576 B2 | * | 12/2002 | Tanaka et al. ............... 379/156 |

FOREIGN PATENT DOCUMENTS

| | | |
|---|---|---|
| JP | 11-198969 | 1/2001 |
| JP | 2001028771 | 1/2001 |
| WO | WO 94/28664 | 12/1994 |

OTHER PUBLICATIONS

U.S. Appl. No. 09/125,154, filed Feb. 11, 1997, Tanaka et al.

* cited by examiner

Primary Examiner—Curtis Kuntz
Assistant Examiner—Barry W. Taylor
(74) Attorney, Agent, or Firm—Finnegan, Henderson, Farabow, Garrett & Dunner, L.L.P.

(57) ABSTRACT

An interface unit connected between a telephone and a telephone network sets a data transmission speed to an optimum speed. The interface unit transmits a type query signal to the telephone terminal at a first speed. The telephone terminal transmits a type signal to the interface unit at the first speed in response to the type query signal. When the interface unit receives the type signal from the telephone terminal, the interface unit changes a transmission speed to a second speed higher than the first speed if the received type signal indicates that the telephone terminal is capable of transmitting data at the second speed. The interface unit also transmits a speed change request to the telephone terminal at the second speed.

5 Claims, 9 Drawing Sheets

KEY TELEPHONE SYSTEM AND INTERFACE UNIT FOR KEY TELEPHONE

CROSS-REFERENCE TO RELATED APPLICATIONS

This application is based upon the prior Japanese Patent Application No. 11-198969, filed Jul. 13, 1999, the entire contents of which are incorporated herein by reference.

BACKGROUND OF THE INVENTION

The present invention relates to a key telephone system and an interface unit for a key telephone.

In recent years, a key telephone system is widely used in an office or the like. In the key telephone system, a main unit containing a plurality of key telephones is connected to an office line or a public switched telephone network. Data including speech data and control data are transmitted between the key telephone and the main unit in a predetermined data transmission scheme which depends on the system. The data transmission scheme controls the transmission speed and the transmission data format.

The key telephone and the main unit can be independently purchased and therefore respectively updated. However, if the main unit is only updated to be a new one capable of transmitting data at high speed, the conventional key telephones cannot be used since they are not capable of transmitting data at high speed. Therefore, the resources cannot be used efficiently.

BRIEF SUMMARY OF THE INVENTION

Accordingly, it is an object of the present invention to provide a key telephone system and its interface unit which can update either of the key telephone and the main unit with keeping compatibility.

According to the present invention, there is provided an interface unit adapted to be communicated with a telephone at one of plural transmission speeds, the unit comprising a first transmitter configured to transmit a type query signal to the telephone at a first speed, a first receiver configured to receive a type signal from the telephone at the first speed, and a second transmitter configured to transmit a speed change request to the telephone and change a transmission speed to a second speed if the received type signal indicating that the telephone is capable of transmitting data at the second speed.

According to the present invention, there is provided an interface unit for a telephone system comprising a telephone terminal and the interface unit, the interface unit being connected between to a telephone network, the telephone terminal being capable of operating at one of a first speed and a second speed which is faster than the first speed, the interface unit comprising a transmitter configured to transmit data to the telephone terminal at one of the first speed and the second speed, a receiver configured to receive data from the telephone terminal at one of the first speed and the second speed, a detector configured to detect whether or not the telephone terminal is capable of transmit and receive data at the second speed, and a mode setting device configured to set an operation speed of the transmitter and the receiver to an optimum speed based on the detection result of the detector.

According to the present invention, there is provided a key telephone system and its interface unit which can update either of the key telephone and the main unit with keeping compatibility.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a key telephone system according to the present invention will now be described with reference to the accompanying drawings.

Figure 1:
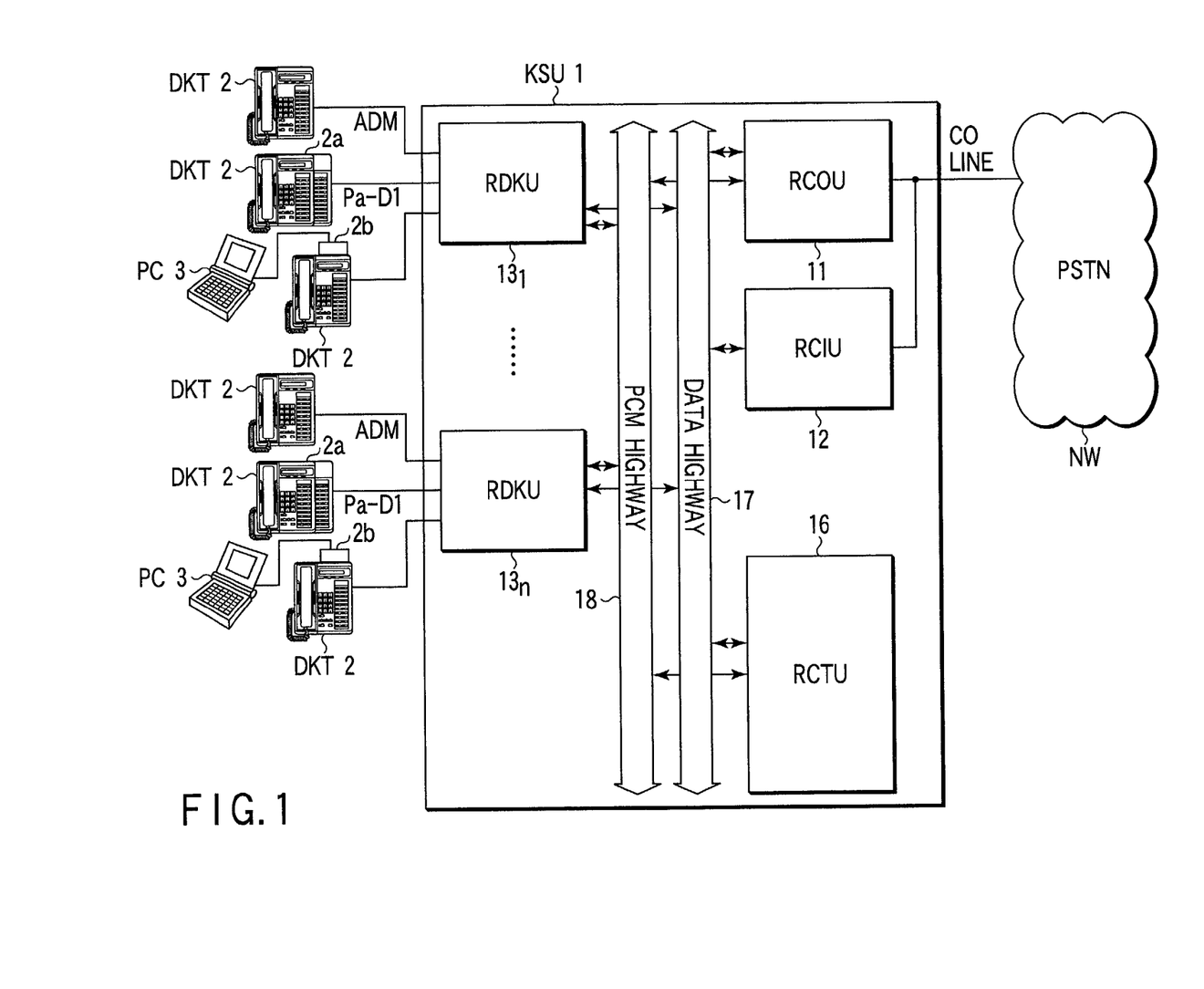
FIG. 1 is a block diagram of a key telephone system according to an embodiment of the present invention.

FIG. 1 is a block diagram showing the arrangement of the digital key telephone system according to an embodiment of the present invention. The key telephone system comprises a main unit (KSU) 1 connected to a public switched telephone network (PSTN) NW through a subscriber line (CO line). Digital key telephones (DKTS) 2 are connected to the extension lines of the main unit 1 as extension terminals.

The main unit 1 comprises an office line interface unit 11 (RCOU), a calling line identification information interface unit (RCIU) 12, digital key telephone interface units (RDKU) $13_1$ to $13_n$ (according to the present invention, each of the RDKU $13_1$ to $13_n$ may have a different transmission speed), and a control unit (RCTU) 16. Each of the digital key telephone interface units $13_1$ to $13_n$ contains a predetermined number of key telephones 2 (in this case, eight). The details of the main unit 1 is described in the copending U.S. patent application Ser. No. 09/125,154 (filed on Aug. 13, 1998), the entire contents of which are incorporated herein by reference.

The interface units 11, 12, and $13_1$ to $13_n$ are connected to the control unit 16 through a data highway 17 and a PCM highway 18. The data highway 17 is used to transmit control data between the units. The PCM highway 18 is used to transmit a digital speech communication signal between the units. The office line interface 11 includes a leased line, a private branch exchange (PBX), and an interface (not shown) connected to another key telephone system.

The central office line interface unit (RCOU) 11 performs an office line interface operation for a public network NW, e.g., call reception detection, polarity inversion detection, opening/closing of a DC loop, dial transmitting, or the like under the control of the control unit (RCTU) 16, and also performs processing of converting an analog speech signal arriving via the subscriber line (CO line) into a PCM signal or processing of converting a PCM signal transferred from the control unit 16 into an analog speech signal and transmitting the speech signal to the subscriber line.

Figure 2:
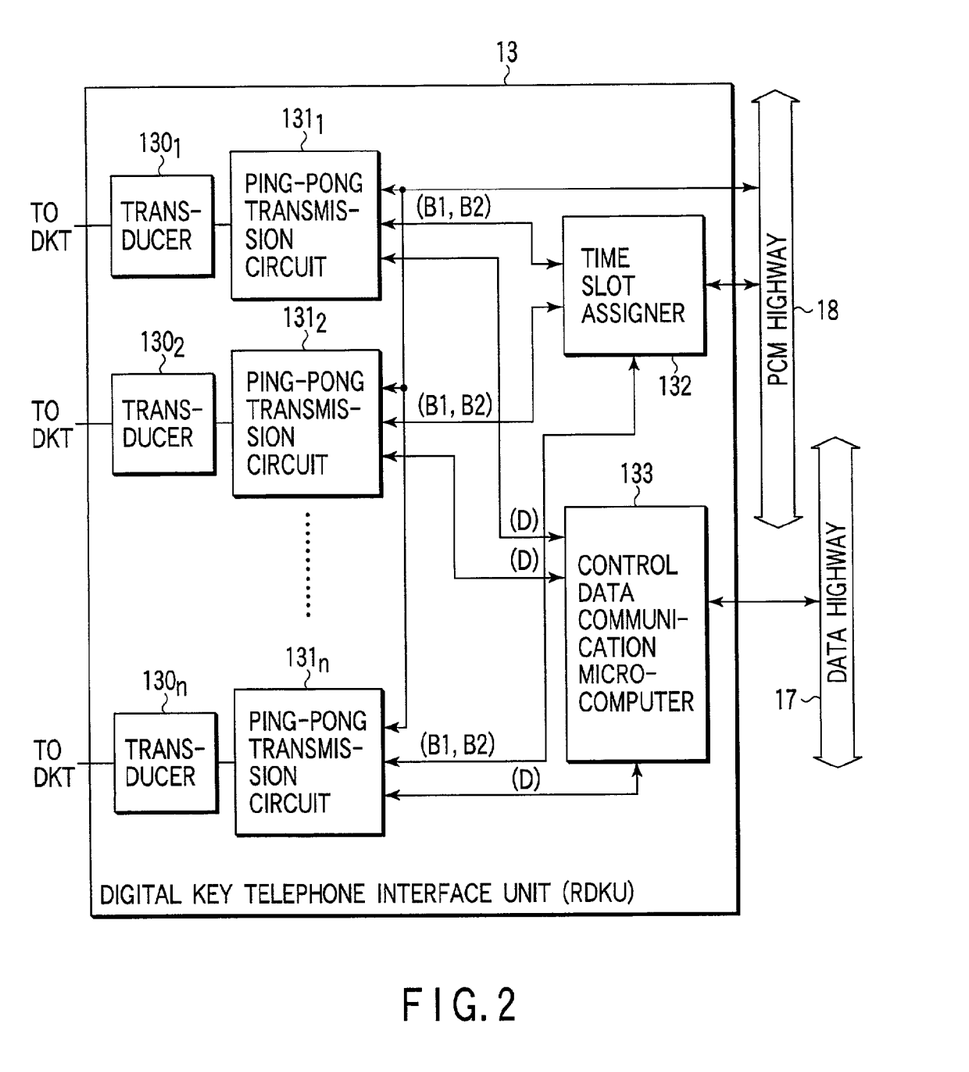
FIG. 2 is a block diagram of an interface unit in a main unit of the key telephone system according to the embodiment.

Each of the digital key telephone interface unit (RDKU) $13_1$ to $13_n$ as an interface between the main unit 1 and each of the digital key telephones (DKT) 2 is configured as shown in FIG. 2. The RDKU 13 has ping-pong transmission circuits $131_1$ to $131_n$ corresponding to the number of extension lines. The digital key telephone interface units (RDKU) $13_1$ to $13_n$ may be connected to digital key telephones (DKT) 2 having different transmission speed modes. Each of the ping-pong transmission circuits $131_1$ to $131_n$ performs ping-pong transmission of speech or information terminal data and control data between the RDKU 13 and a corresponding one of the digital key telephones (DKT) 2 by using a time division channel of a (2B+D) scheme, i.e., having two B channels (B1 and B2) with a transmission rate of 64 kpbs and one D channel with a transmission rate of 16 kbps. The ping-pong transmission circuit 131 has a (2B+D) generation section and a (2B+D) separation section. The (2B+D) generation section synthesizes speech data and information terminal data on downward link channels B1 and B2 from the PCM highway 18 and control data on a downward link channel D from a control data communication microcomputer 133 into a data packet with a (2B+D) format and transmits the data packet to each of the digital key telephones 2. The (2B+D) separation section separates an upward link data packet arriving from each of the digital key telephones 2 into speech and information terminal data on the upward link channels B1 and B2 and control data on the upward link channel D and transfers the data to the PCM highway 18 and the control data communication microcomputer 133. The B1 channel is assigned to speech data transmission to each of the digital key telephones 2 while the B2 channel is assigned to transmit information terminal data when an information terminal such as a personal computer 3 is connected to each of the digital key telephones 2.

A time slot assigner 132 receives a frame synchronous signal and clock signal from the PCM highway 18 and notifies the ping-pong transmission circuits $131_1$ to $131_n$ of the timing for transmitting/receiving upward and downward link data on the B channel to/from the PCM highway 18. Therefore, each of the ping-pong transmission circuits $131_1$ to $131_n$ directly accesses the PCM highway 18 at the timing assigned by the time slot assigner 132 to transmit/receive upward and downward link data at a transmission rate of 2,048 Mbps. The control data communication microcomputer 133 monitors D channel data transmitted/received by the ping-pong transmission circuits $131_1$ to $131_n$ and controls to transmit/receive the D channel data to/from the control unit 16 through the data highway 17.

Figure 3:
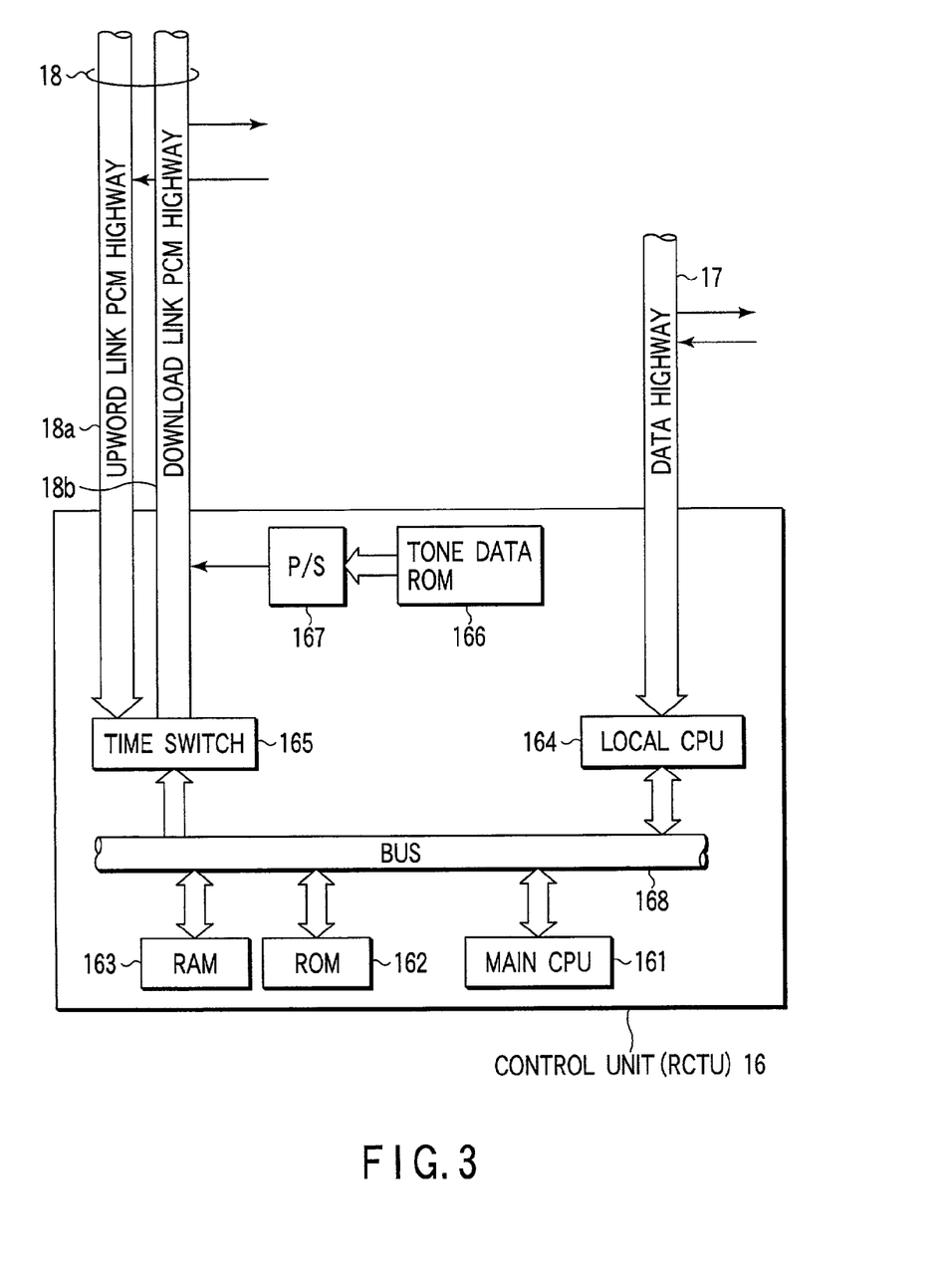
FIG. 3 is a block diagram of a control unit in a main unit of the key telephone system according to the embodiment.

The control unit (RCTU) 16 for systematically controlling the operation of the main unit 1 is configured as shown in FIG. 3. The control unit 16 includes a main CPU 161 formed of a microprocessor. The main CPU 161 is connected to a ROM 162, a RAM 163, a local CPU 164, and a time switch 165 through a bus 168. The ROM 162 stores various programs or control data necessary for switching control in advance. The RAM 163 is used to store maintenance data, user data, or control data generated in various control processes. The local CPU 164 controls control data transfer between the main CPU 161 and the data highway 17.

The control unit 16 also includes a tone data ROM 166 and a parallel/serial conversion circuit (P/S) 167. The tone data ROM 166 reads out tone data representing a tone signal to be supplied to the digital key telephones 2 as extension terminals in accordance with an instruction from the main CPU 161 during various services such as holding, transfer, or camp-on. The parallel/serial conversion circuit 167 converts the tone data read out from the tone data ROM 166 as a parallel signal into a serial signal and transmits the signal to the data highway 17.

The time switch 165 performs time slot switching processing between an upward link PCM highway 18a and a downward link PCM highway 18b under the control of the main CPU 161.

Figure 4:
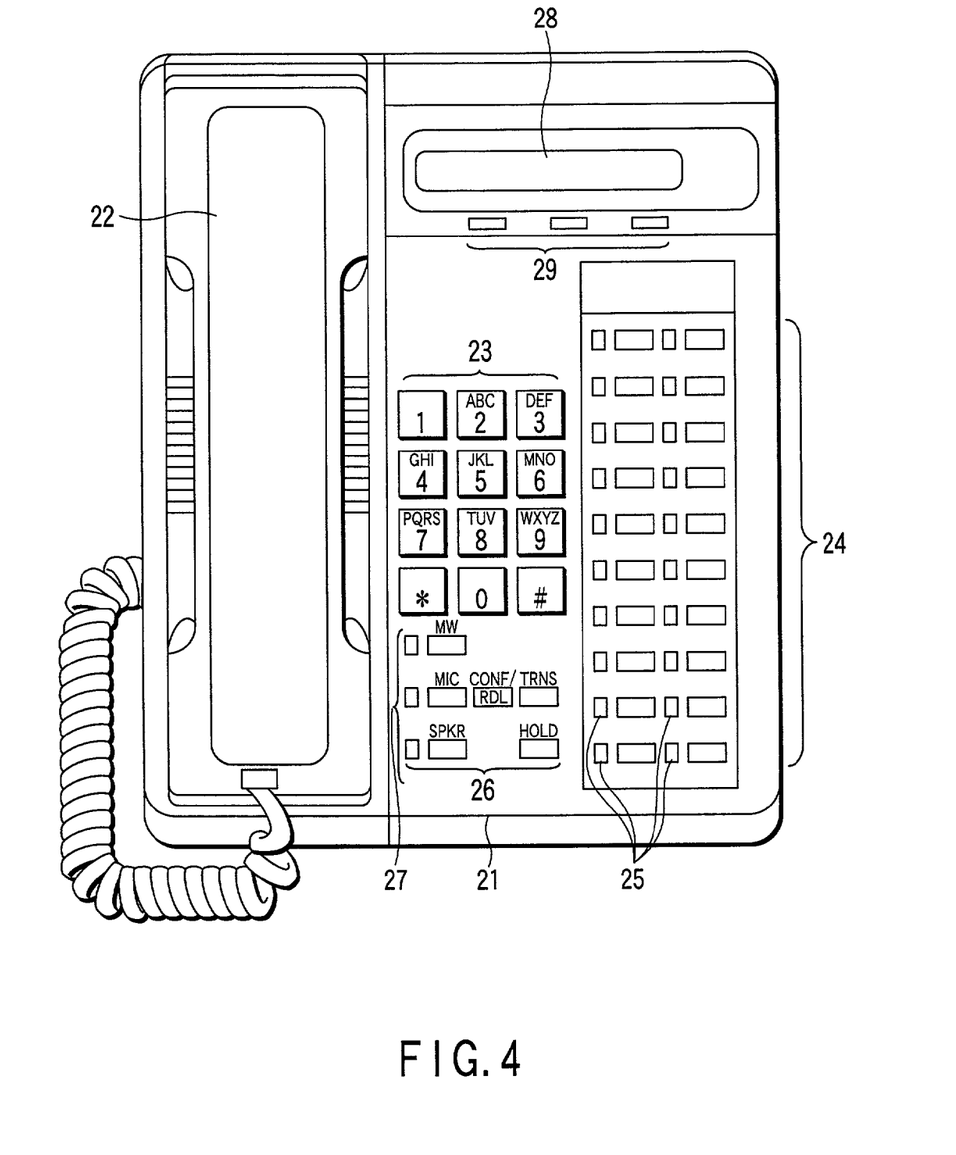
FIG. 4 is an external view of a key telephone according to the embodiment.
Figure 5:
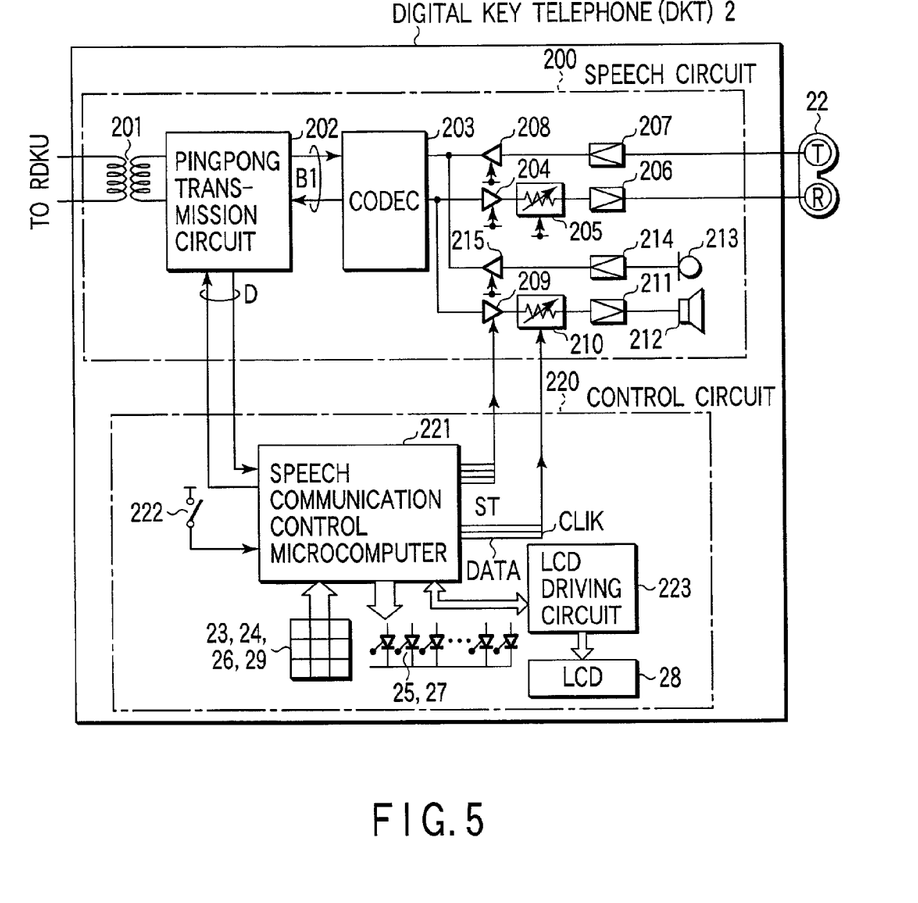
FIG. 5 is a block diagram of a digital key telephone of the key telephone system according to the embodiment.

FIG. 4 is a plan view showing the outer appearance of each the digital key telephones 2. FIG. 5 is a block diagram showing the circuit arrangement of each of the digital key telephones 2.

As shown in FIG. 4, a handset 22 is mounted on the cradle portion of a telephone body 21. The operation panel of the telephone body 21 has dial buttons 23, a plurality of flexible buttons 24, a plurality of LED display devices 25 respectively corresponding to the flexible buttons 24, a plurality of control buttons 26, LED display devices 27 each corresponding to a predetermined control button, and an LED display device 28. The flexible buttons 24 are used by the user to freely set various functions such as an office line calling or automatic dialing.

Examples of functions to be set other than office line calling are leased line calling, automatic dialing, pause, long pause, automatic redialing, saving, subaddress transmitting, dial transmitting, privacy cancel, messaging, message switching, message waiting, night switching, call reception rejection, absence transfer, fixed absence transfer, camp-on, pooling, park holding, call pickup, call answering, broadcasting, microphone-off, hot line, and conference/transfer.

Leased line calling is used for calling in communication between terminals connected to an intra-office communication network.

For automatic dialing, the telephone numbers of parties to be called are registered in a memory in advance in correspondence with the flexible buttons. Depressing a flexible button allows automatic calling to the corresponding called party. Pause is a function of inserting a pause between, e.g., an office line calling dial number and a called party dial number in abbreviated dialing registration. Long pause is a function of inserting a longer pause. Automatic redialing is a function of automatically repeating redialing when the called party is busy.

In saving, in a period from the end of the dialing operation to the end of the speech communication, a flexible button for which the save function is set is depressed to temporary store the dial number of the called party. After the speech communication is complete, automatic calling to the same called party is allowed by depressing the flexible button for which the save function is set.

Subaddress transmitting is a function used to designate one of a plurality of communication terminal devices connected to one digital line on the side of the other communication party connected to the ISDN.

In dial transmitting, the dial number and subaddress of the called party are input and then sent in calling to the ISDN.

Call reception rejection is a function of rejecting a call from another extension line. When an extension terminal for which call reception rejection is set is called, a busy tone with a period shorter than that of a normal busy tone is returned.

Messaging is a function of registering a message for absence answering in advance and transmitting the message to the calling line upon receiving a call in absence of the called party. Message switching is a function of selecting one of a plurality of messages recorded in advance for absence answering. Message waiting is a function of causing the called terminal to display a message by designating it on the calling side when the called party is busy or absent.

Night switching is a function of switching between extension terminals for receiving a call in the daytime or weekdays and those for receiving a call in the nighttime or holidays.

Absence transfer or fixed absence transfer is a function of registering the extension number of a transfer destination in advance, and when a call is received in the absence transfer mode, automatically transferring the call to the transfer destination.

Absence transfer and fixed absence transfer are different in the following points. In absence transfer, the user can register or cancel the desired transfer destination anytime. In fixed absence transfer, once the transfer destination is set at the time of installation, it cannot be changed later.

Transfer destination setting for absence transfer can be made not only from the extension terminal as the transfer source but also from another extension terminal.

In camp-on, when a called extension terminal or office line terminal is busy, the calling terminal sets camp-on and goes on-hook. After the called terminal completes speech communication, the calling terminal is notified of it. The calling terminal automatically calls the called terminal upon off-hook. When the called terminal answers the call, the called terminal and the calling terminal are connected to allow speech communication.

In pooling, a number of accommodated office lines are divided into groups, and each group is assigned to a pool. By designating one pool, all office lines of the group assigned to the pool can be selectively used. This function is effectively used when there are a lot of office lines, and they cannot be individually assigned to the flexible buttons.

Park holding is a function used to hold speech communication by using the pool. Holding using no pool is performed by depressing a holding button.

Call pickup or call answering is a function of answering an office line call in an extension terminal by a one-touch or special number operation when nobody answers the call. Call pickup and call answering are different in the following points. In call pickup, all office line calls can be answered. In call answering, however, a plurality of office lines are divided into groups, and the call answering function is set for different flexible buttons in units of groups, thereby allowing call answering for each group.

Broadcasting is a function of voice-calling all extension terminals or the extension terminals of a group. The microphone-off function is used when the called party does not want to answer by voice in broadcasting or group call. In this case, the microphone for loudspeaking speech communication is turned off. Privacy cancel is a function of adding a third party to speech communication by a one-touch operation during office line speech communication to allow conference speech communication.

Hot line is a function of calling a desired extension terminal by a one-touch operation. During office line speech communication, by depressing a flexible button for which the hot line function is set, the call can be transferred by voice (call transfer) or a transfer tone (ring transfer). By depressing a flexible button for which conference/transfer is set when the transfer destination party answers the call, the mode changes to an office line conference mode. When the flexible button f or which the hot line is set is depressed during extension speech communication, the extension speech communication is held. By depressing the flexible button for which conference/transfer is set when the other party of extension hot line answers the call, the mode changes to the extension conference mode. When the handset goes on-hook in the extension conference mode, the extension call is transferred.

Each of the digital key telephones 2 is formed of a speech communication circuit 200 and a control circuit 220, as shown in FIG. 5. Each of the digital key telephones 2 has, as speech communication modes, a handset speech communication mode using the handset 22 and a hands-free speech communication using a hands-free loudspeaker 212 and a hands-free microphone 213.

When the handset speech communication mode is selected, a transmission signal input by the microphone of the handset 22 is input to a codec 203 through a transmission amplifier 207 and a channel switch 208. When the hands-free speech communication is selected, a transmission signal output from the hands-free microphone 213 is input to the codec 203 through a transmission amplifier 214 and a channel switch 215.

The codec 203 converts the input transmission signal into speech communication data by PCM coding and supplies the speech communication data to a ping-pong transmission circuit 202 as B1 channel data. The ping-pang transmission circuit 202 has a (2B+D) synthesis section. The (2B+D) synthesis section 5 synthesizes the B1 channel speech communication data with D channel control data output from a speech communication control microcomputer 221 (to be described later) to generate upward link transmission data having the (2B+D) format. This transmission data is sent to the RDKU 13 through a transducer 201.

Downward link transmission data having the (2B+D) format, which arrives from the RDKU 13, is input to the ping-pong transmission circuit 202 through the transducer 201. The ping-pong transmission circuit 202 15 has a (2B+D) separation section. The (2B+D) separation section performs processing of separating the downward link transmission data into B1 and B2 channel speech communication data and D channel control data. The B1 channel speech communication data is supplied to the codec 203. The D channel control data is supplied to the speech communication control microcomputer 221.

The codec 203 performs signal processing of PCM-decoding the B1 channel speech communication data to reproduce the reception signal. In the handset speech communication mode, the reception signal is supplied to the loudspeaker of the handset 22 through a channel switch 204, an attenuator 205, and a reception amplifier 206. In the hands-free mode, the reception signal is supplied to the hands-free loudspeaker 212 through a channel switch 209, an attenuator 210, and a reception amplifier 211 and output from the loudspeaker 212.

The control circuit 220 has the speech communication control microcomputer 221. The speech communication control microcomputer 221 systematically performs all control operations associated with speech communication while transmitting/receiving control data to/from the main unit 1. The control contents include an operation of detecting the operation information of the dial buttons 23, the flexible buttons 24, the control buttons 26, and a hook switch 222, ON/OFF-control of the plurality of LED display devices 25 and 27, control of supplying display data to an LCD driving circuit 223 to cause the LED display device 28 to display it, selective ON/OFF-control of the channel switches 204, 208, 209, and 215 in accordance with the speech communication mode, and control of changing the attenuation amount of the attenuator 205 or 210 in accordance with the operation amount of the volume control (not shown). The digital key telephone has a PC interface unit (not shown).

Figure 6:
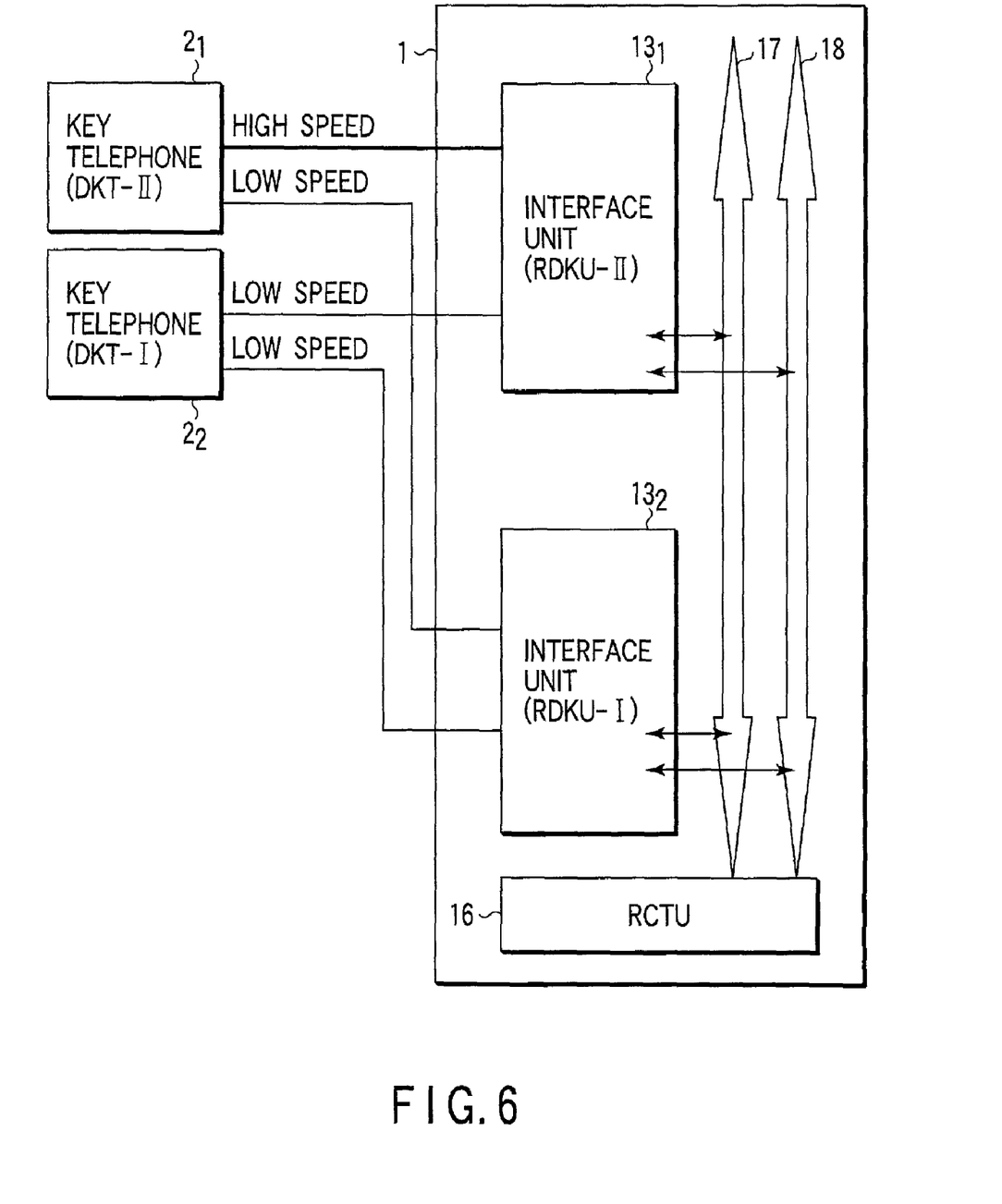
FIG. 6 is a block diagram showing one example of a system configuration of the key telephone system according to the embodiment.

FIG. 6 is a block diagram showing one example of a system configuration of the key telephone system according to the embodiment. In this example, the main unit 1 comprises a conventional digital key telephone interface unit (RDKU-I) $13_2$ which is capable of transmitting data only at low speed and a new digital key telephone interface unit (RDKU-II) $13_1$ which is capable of transmitting data at low and high speeds. A conventional digital key telephone (DKT-I) $2_2$ which is capable of transmitting data only at low speed and a new digital key telephone (DKT-II) $2_1$ which is capable of transmitting data at low and high speeds are both connected to the interface units (RDKU-II) $13_1$ which and (RDKU-I) $13_2$.

Figure 7:
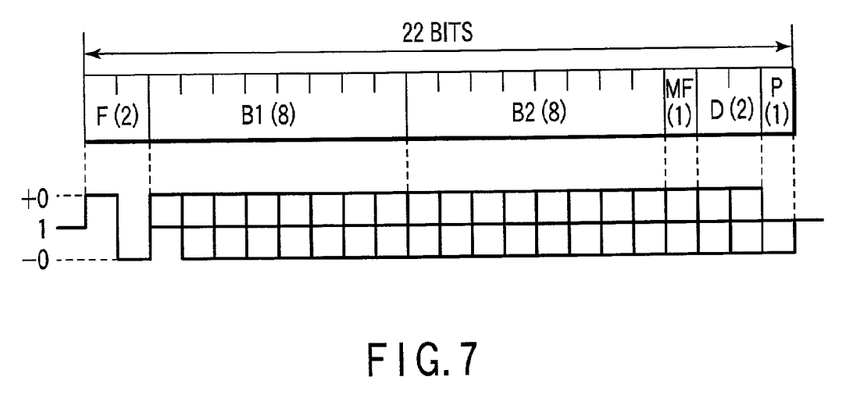
FIG. 7 shows a data format transmitted between the main unit and the telephone according to the embodiment.

FIG. 7 shows a data format of data transmitted between the main unit 1 (interface unit 13) and the key telephone 2. One frame of ping-pong transmission data is formed of 22 bits including start code F (2 bits), B1 and B2 channels (8 bits each), MF bit (1 bit), D channel (control channel) (2 bits), and a parity P (1 bit). The start code F is formed of "00". In case of no speech signal, the B1 and B2 channels are all "1". The MF bit is "0". The transfer rate of the B1 and B2 channel is 64 Kbps and that of the D channel is 16 Kbps.

The waveform is an example of an AMI coded data.

Figure 8:
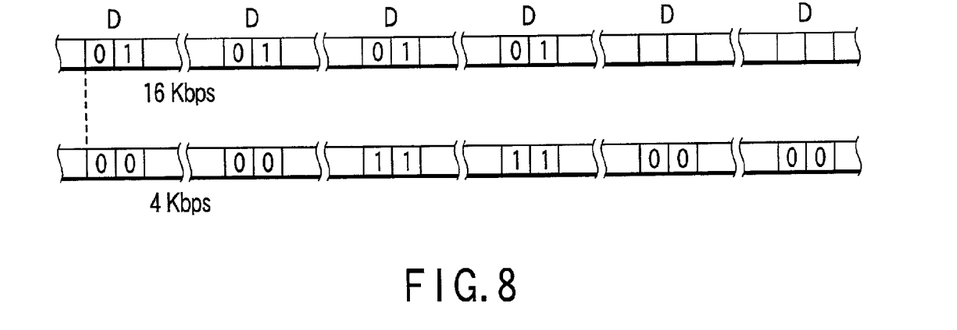
FIG. 8 shows a data format in 16 Kbps transmission speed and 64 Kbps transmission speed.

It is assumed that there are two types of data transmission schemes with regard to control data transmission; one is to transmit data at 16 Kbps and the other at 4 Kbps. If one-byte data "01010101" is transmitted at 16 Kbps, each bit of the one-byte data "01010101" is transmitted by each bit of the D channel, as shown in FIG. 8. If the one-byte data "01010101" is transmitted at 4 Kbps, each bit of the one-byte data "01010101" is transmitted four times by each bit of the D channel. In this case, "00011110001111000111110001111" is transmitted. Thus, the transmitted data of 4 Kbps can be sampled by a longer sampling interval than that of the 16 Kbps.

Figure 9:
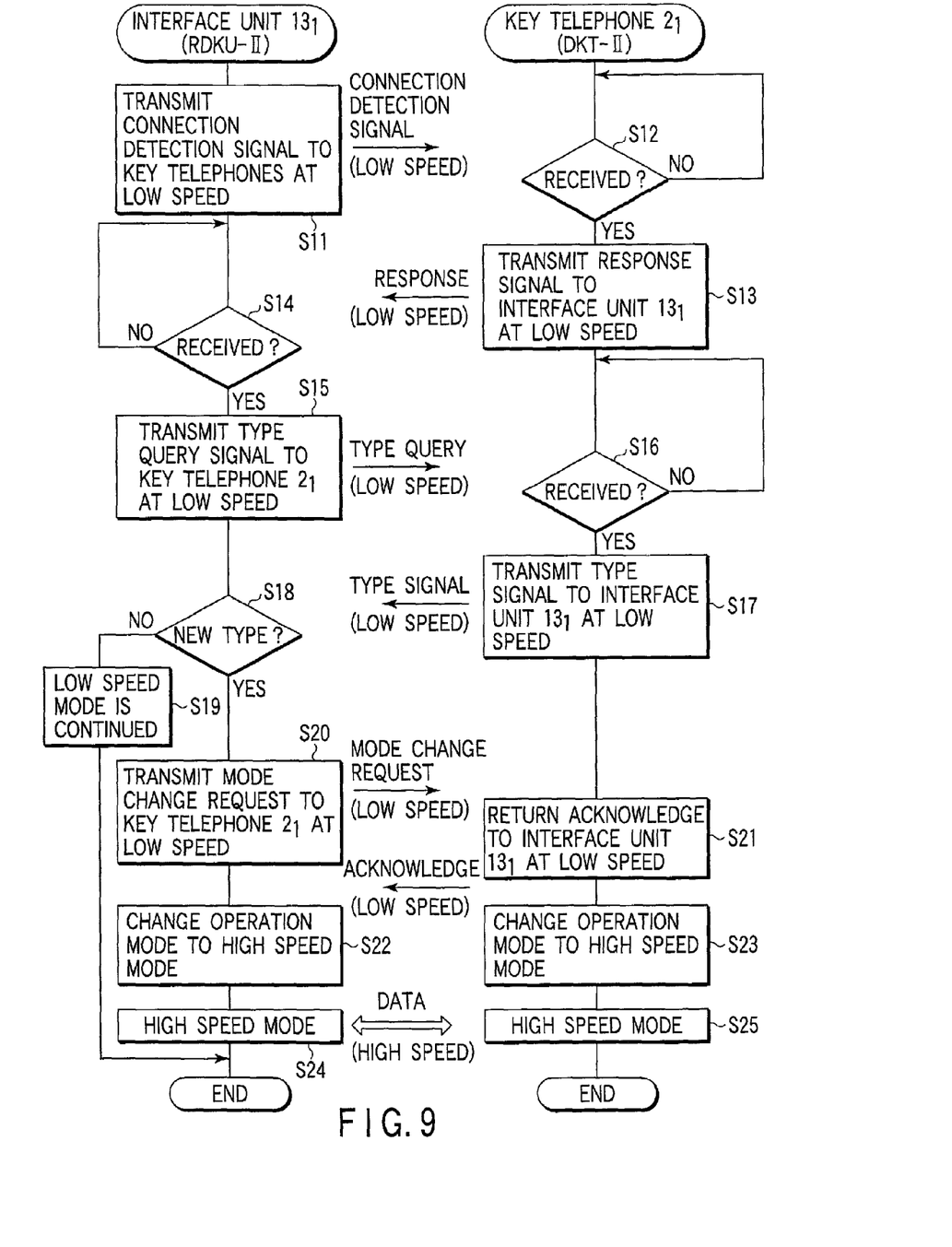
FIG. 9 is a flow chart showing an example of a transmission speed negotiation of the key telephone system according to the embodiment.

FIG. 9 is a flowchart illustrating a transmission speed negotiation in the key telephone system formed of a new type of key telephone (DKT-II) $2_1$ and a new type of interface unit (RDKU-II) $13_1$ interconnecting thereto, which is constructed as illustrated in FIG. 1 to FIG. 4.

The key telephone $2_1$ and interface unit $13_1$ initially operates in a low speed transmission mode.

In step S11, the interface unit $13_1$ transmits a telephone connection detection signal to the key telephones 2 at low speed in order to synchronize key telephones 2 with the interface unit $13_1$. When the key telephone $2_1$ receives the connection detection signal in step S12, it is synchronized with the interface unit $13_1$ and then transmits a response signal to the interface unit $13_1$ at low speed in step S13.

When the interface unit $13_1$ receives the response signal in step S14, it transmits a type query signal to the key telephone $2_1$ at low speed in step S15. When the key telephone $2_1$ receives the type query signal in step S16, it transmits a type signal to the interface unit $13_1$ at low speed in step S17.

When the interface unit $13_1$ receives the type signal, it is determined in step S18 whether or not the key telephone $2_1$ is a new type capable of data transmission at high speed. When it is determined that the key telephone $2_1$ is not the new type, the interface unit $13_1$ keeps operating in the low speed transmission mode as shown in step S19.

When it is determined that the key telephone $2_1$ is the new type, the interface unit $13_1$ transmits a mode change request to the key telephone $2_1$ at low speed in step S20. In response to the mode change request, the key telephone $2_1$ returns an acknowledge to the interface unit $13_1$ at low speed in step S21.

When the interface unit $13_1$ receives the acknowledge, it changes the operation mode to a high speed transmission mode in step S22. The key telephone $2_1$ also changes the operation mode to the high speed transmission mode in step S23 after it returns the acknowledge. Thereafter, the interface unit $13_1$ and the key telephone $2_1$ operates in the high speed transmission mode as shown in steps S24 and S25.

As described above, the key telephone system according to the embodiment determines an optimum transmission speed corresponding to the type of the key telephone detected via data transmission between the key telephone and the interface unit established in initial stage at low speed, and then, alters the transmission speed from a low speed to a higher transmission speed. By caring out the steps as described above, it is possible to provide a key telephone system which is formed of conventional and new interface units and conventional and new telephones and in which an optimum transmission speed corresponding to the type of the telephone is set. Accordingly, it is possible to provide a key telephone system which is enabled to establish a stable and a most effective speed setting automatically.

If the initial speed is set to the high speed and the transmission speed is made to fall back during negotiation, there will occur following drawbacks. Depending on the connection timing between the interface unit 13 and the key telephone 2, i.e., when the interface unit 13 is not ready to operate at the time of connection, the low speed transmission mode may be set. Further, when the interface unit 13 and the key telephone 2 erroneously recognize a negotiation signal, the high speed mode is continued so that any signal is not received.

Figure 10:
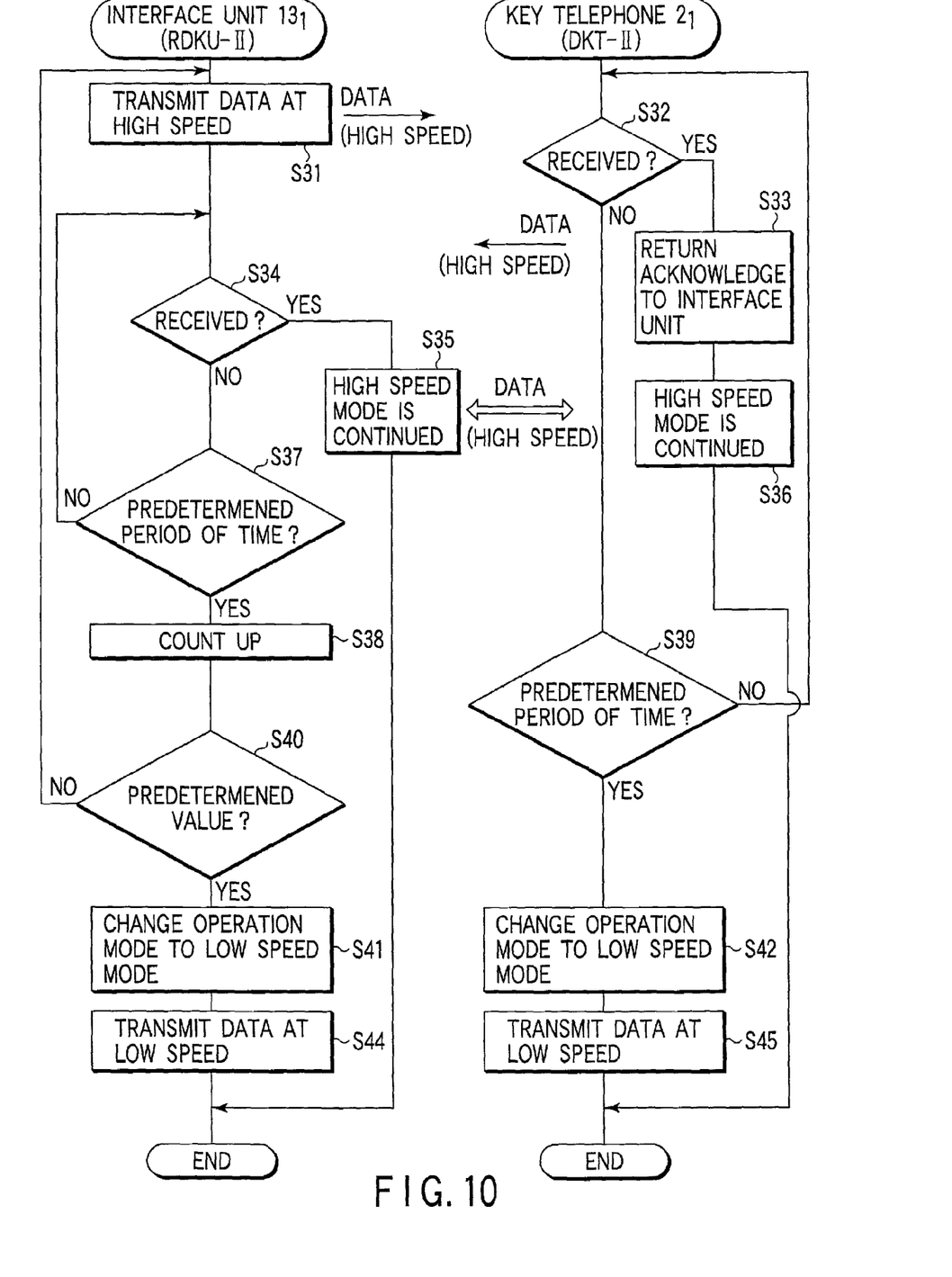
FIG. 10 is a flow chart showing another example of a transmission speed negotiation of the key telephone system according to the embodiment.

FIG. 9 shows an example to change the transmission speed from the low speed to the high speed. FIG. 10 shows an example to change the transmission speed from the high speed to the low speed. If some trouble occurs, for example, the key telephone $2_1$ is turned off or is disconnected from the interface unit $13_1$, the interface unit $13_1$ does not receives the acknowledge. FIG. 10 copes with such a case.

While the interface unit $13_1$ and the key telephone $2_1$ operates in the high speed transmission mode, the interface unit $13_1$ transmits data to the key telephone $2_1$ at high speed as shown in step S31.

When the key telephone $2_1$ receives the high speed transmission data in step S32, it returns an acknowledge to the interface unit $13_1$ at high speed in step S33. Thereafter, the key telephone $2_1$ keeps operating in the high speed transmission as shown in step S36.

When the interface unit $13_1$ receives the acknowledge in step S34, it keeps operating in the high speed transmission mode as shown in step S35.

Case 1: When the key telephone is disconnected and then connected again, the key telephone is set to the low speed transmission mode. The interface unit $13_1$ does not receives the acknowledge over a predetermined period of time (step S37), the interface unit $13_1$ counts up in step S38. In step S40, it is determined whether or not the count value exceeds a predetermined value. When the count value exceeds the predetermined value, the interface unit $13_1$ changes the operation mode to a low speed mode in step S41.

Case 1: It is assumed that the key telephone is set to the low speed transmission mode. When the key telephone $2_1$ does not receive the high speed transmission data in step S32, it is determined whether or not a predetermined period of time has elapsed in step S39.

When the key telephone $2_1$ does not receive the high speed data over the predetermined period of time, the key telephone $2_1$ changes the operation mode to a low speed mode in step S42. Thereafter, the interface unit $13_1$ and the key telephone $2_1$ operates in the low speed transmission mode as shown in steps S44 and S45.

As described above, it is possible to change the transmission speed from the high speed to the low speed if a trouble occurs in the high speed transmission mode.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above description, for the purpose of simplification, it is assumed that the number of transmission modes is two, i.e., a high speed mode and a low speed mode. However, it may be provided with speed alteration of more than three.

According to the present invention, in a key telephone system, it is possible to set an optimum transmission speed by detecting a type of the key telephone in an initial operation. The type is detected by transmitting a query signal at low speed. If it is detected that the telephone is a type capable of transmitting data at high speed, the transmission speed is set to the high speed.

What is claimed is:

1. An interface unit capable of being connected to a main unit of a key telephone system, the main unit connecting a telephone terminal to a telephone network, the interface unit adapted to communicate with the telephone terminal at a high or low transmission speed, the interface unit comprising:

a first transmitter configured to transmit a type query signal to the telephone terminal at the low speed;

a first receiver configured to receive a type signal from the telephone terminal at the low speed;

a second transmitter configured to transmit a speed change request to the telephone terminal at the low speed and change a transmission speed from the low speed to the high speed if the received type signal indicates that the telephone terminal is capable of transmitting data at the high speed;

a detector configured to determine whether data is transmitted from the telephone terminal at the high speed or the low speed; and a speed change unit configured to change a transmission speed from the high speed to the low speed when the detector determines that the data is transmitted from the telephone terminal at the low speed.

2. A key telephone system comprising a telephone terminal and a main unit which connects the telephone terminal to a telephone network, and includes a telephone interface unit connected to the telephone terminal, a network interface unit connected to a telephone network, and a connection line connecting the telephone interface unit and the network interface unit, wherein said telephone interface unit comprises:

a first transmitter configured to transmit a type query signal to the telephone terminal at a low speed;

a first receiver configured to receive a type signal from the telephone terminal at the low speed;

a second transmitter configured to transmit a speed change request to the telephone terminal at the low speed and change a transmission speed from the low speed to a high speed if the received type signal indicates that the telephone terminal is capable of transmitting data at the high speed;

a detector configured to determine whether data is transmitted from the telephone terminal at the high speed or the low speed; and a speed change unit configured to change a transmission speed from the high speed to the low speed when the detector determines that the data is transmitted from the telephone terminal at the low speed; and said telephone terminal comprising:

a first transmitter configured to transmit the type signal to the interface unit at the low speed in response to the type query signal; and a first receiver configured to receive the speed change request transmitted from said second transmitter at the low speed and to change a transmission speed from the low speed to the high speed in response to the receiver speed change request.

3. A transmission speed control method for a key telephone system comprising a telephone terminal and a main unit which connects the telephone terminal to a telephone network, the method comprising:

causing the interface unit to transmit a type query signal to the telephone terminal at a low speed;

causing the telephone terminal to transmit a type signal to the interface unit at the low speed in response to the type query signal;

causing the interface unit to receive the type signal from the telephone terminal at the low speed;

causing the interface unit to transmit a speed change request to the telephone terminal at the low speed and change a transmission speed from the low speed to a high speed if the received type signal indicates that the telephone terminal is capable of transmitting data at the high speed;

causing the telephone terminal to change a transmission speed from the low speed to the high speed in response to the speed change request;

causing the interface unit to determine whether data is transmitted from the telephone terminal at the high speed or the low speed; and causing the interface unit to change a transmission speed from the high speed to the low speed when it is determined that the data is transmitted from the telephone terminal at the low speed.

4. An interface unit for a key telephone system comprising a telephone terminal and a main unit which connects the telephone terminal to a telephone network and includes the interface unit capable of being connecting to the telephone terminal, the telephone terminal being capable of operating at a high or low speed, the interface unit comprising:
- a transmitter configured to transmit a type query signal to the telephone terminal at the low speed;
- a receiver configured to receive a type signal from the telephone terminal at the low speed;
- a detector configured to detect whether or not the telephone terminal is capable of transmitting and receiving data at the high speed; and
- a mode setting device configured to set an operation speed of said transmitter and said receiver to an optimum speed based on a detection result of said detector.

5. The interface unit according to claim 4, further comprising:
- a mode change requesting device configured to cause the telephone terminal to set an operation speed to the optimum speed based on the detection result of said detector.

* * * * *

UNITED STATES PATENT AND TRADEMARK OFFICE
CERTIFICATE OF CORRECTION

PATENT NO. : 6,978,000 B2
DATED : December 20, 2005
INVENTOR(S) : Niiya

It is certified that error appears in the above-identified patent and that said Letters Patent is hereby corrected as shown below:

Column 11,
Line 2, change "connecting" to -- connected --.

Signed and Sealed this

Fourteenth Day of March, 2006

JON W. DUDAS
*Director of the United States Patent and Trademark Office*